(12) United States Patent
Shibuno et al.

(10) Patent No.: US 8,311,407 B2
(45) Date of Patent: Nov. 13, 2012

(54) CAMERA SYSTEM, CAMERA BODY, AND INTERCHANGEABLE LENS

(75) Inventors: Koji Shibuno, Osaka (JP); Mitsuyoshi Okamoto, Osaka (JP); Naotake Kitahira, Osaka (JP)

(73) Assignee: Panasonic Corporation, Osaka (JP)

( * ) Notice: Subject to any disclaimer, the term of this patent is extended or adjusted under 35 U.S.C. 154(b) by 495 days.

(21) Appl. No.: 12/411,499

(22) Filed: Mar. 26, 2009

(65) Prior Publication Data

US 2009/0245778 A1   Oct. 1, 2009

(30) Foreign Application Priority Data

Mar. 28, 2008   (JP) .................................. 2008-086082

(51) Int. Cl.
  *G03B 13/36*   (2006.01)
(52) U.S. Cl. ....................................................... 396/133
(58) Field of Classification Search ................... 396/133
  See application file for complete search history.

(56) References Cited

U.S. PATENT DOCUMENTS

| | | | |
|---|---|---|---|
| 4,477,167 A | 10/1984 | Ishikawa et al. | |
| 4,712,072 A | 12/1987 | Kawanabe | |
| 4,792,819 A | 12/1988 | Akashi | |
| 5,153,629 A * | 10/1992 | Kaneda | 396/135 |
| 5,604,560 A * | 2/1997 | Kaneda | 396/133 |
| 5,839,002 A * | 11/1998 | Miyake et al. | 396/91 |
| 2003/0189662 A1 | 10/2003 | Matsuda | |
| 2004/0037548 A1 | 2/2004 | Higuma | |
| 2005/0128339 A1 | 6/2005 | Masuda | |
| 2006/0140613 A1 | 6/2006 | Aikawa | |
| 2007/0133970 A1 * | 6/2007 | Honjo et al. | 396/97 |
| 2008/0007644 A1 | 1/2008 | Matsumoto | |
| 2008/0199170 A1 | 8/2008 | Shibuno et al. | |
| 2009/0245777 A1 | 10/2009 | Shibuno et al. | |
| 2009/0245778 A1 * | 10/2009 | Shibuno et al. | 396/135 |
| 2010/0060748 A1 * | 3/2010 | Tsuchiya | 348/222.1 |
| 2010/0103306 A1 | 4/2010 | Ueda et al. | |
| 2011/0096200 A1 | 4/2011 | Shibuno et al. | |

FOREIGN PATENT DOCUMENTS

| | | |
|---|---|---|
| EP | 1351086 | 10/2003 |
| JP | 61-105486 | 5/1986 |
| JP | 4-273225 | 9/1992 |
| JP | 10-161006 | 6/1998 |
| JP | 11-64956 | 3/1999 |
| JP | 2003-295047 | 10/2003 |
| JP | 2004-64713 | 2/2004 |
| JP | 2005-084339 | 3/2005 |
| JP | 2006-146062 | 6/2006 |
| JP | 2006-184440 | 7/2006 |
| JP | 2006-309407 | 11/2006 |
| JP | 2007-148075 | 6/2007 |
| JP | 2007-322922 | 12/2007 |
| JP | 2008-15274 | 1/2008 |

* cited by examiner

*Primary Examiner* — W. B. Perkey
(74) *Attorney, Agent, or Firm* — Panasonic Patent Center (57) ABSTRACT

A camera system includes an interchangeable lens and a camera body. A body controller in the camera body performs control to transmit a timing signal and a drive information signal to the interchangeable lens. A lens controller in the interchangeable lens controls drive of a focus lens based on the drive information signal and the timing signal which are received from the camera body. The drive information signal includes information of a driving time which is a period from a start of driving the focus lens until an end of driving the focus lens.

19 Claims, 8 Drawing Sheets

CAMERA SYSTEM, CAMERA BODY, AND INTERCHANGEABLE LENS

BACKGROUND

1. Technical Field

The technical field relates to a lens-interchangeable camera system, and more particularly to a camera system capable of performing an autofocus operation in a contrast detection method during capture of a moving image.

2. Related Art

JP-A-2003-295047 discloses autofocus control that employs both a phase-difference detection method and a contrast method. An imaging apparatus disclosed in JP-A-2003-295047 corrects focus control information obtained by the phase-difference detection method, based on focus information obtained by the contrast method. Specifically, correction information for compensating for insufficient detection accuracy of the phase-difference detection which has excellent high-speed performance is obtained based on information indicating a focus status obtained by using contrast detection which enables focus determination at high accuracy. This arrangement can provide focus control by the phase-difference detection method with higher speed and higher accuracy compared to the hybrid method, and the like.

As described above, JP-A-2003-295047 discloses an improvement in the focus accuracy of a lens-interchangeable camera system. However, JP-A-2003-295047 discloses an invention for improving the focus accuracy of the phase-difference detection method by correcting focus control information obtained by the phase-difference detection method based on focus information obtained by the contrast method. It does not disclose an improvement in the accuracy of focus information itself that is obtained by the contrast method.

SUMMARY

An object is therefore to provide a lens-interchangeable camera system having improved accuracy of an autofocus operation in a contrast method during capture of a moving image.

A camera system according to one aspect includes an interchangeable lens and a camera body. The interchangeable lens includes a focus lens operable to move back and forth in an optical axis direction to change a focus status of a subject image; a driver operable to drive the focus lens, and a lens controller operable to control an operation of the interchangeable lens under control of the camera body. The camera body includes an imaging unit operable to image a subject at a predetermined frame rate to generate image data, a timing signal generator operable to generate a predetermined timing signal and transmit the predetermined timing signal to the interchangeable lens, a drive signal transmission unit operable to transmit a drive information signal including information of a driving time which is a period from a start of driving the focus lens until an end of driving the focus lens, and a body controller operable to control an operation of the camera body. The body controller performs control to transmit the timing signal and the drive information signal to the interchangeable lens. The lens controller controls drive of the focus lens based on the drive information signal and the timing signal which are received from the camera body.

A camera body according to another aspect is a camera body to which an interchangeable lens having a focus lens capable of moving back and forth in an optical axis direction to change a focus status of a subject is mountable. The camera body includes an imaging unit operable to image a subject at a predetermined frame rate to generate image data, the subject being formed through the interchangeable lens, a timing signal generator operable to generate a predetermined timing signal and transmit the predetermined timing signal to the interchangeable lens, a drive signal transmission unit operable to transmit a drive information signal including information of a driving time which is a period from a start of driving the focus lens until an end of driving the focus lens, and a body controller operable to control an operation of the camera body. The body controller performs control to transmit the timing signal and the drive information signal to the interchangeable lens.

An interchangeable lens according to the other aspect is an interchangeable lens mountable to a camera body. The interchangeable lens includes a focus lens operable to move back and forth in an optical axis direction to change a focus status of a subject image, a driver operable to drive the focus lens, and a lens controller operable to control an operation of the interchangeable lens under control of the camera body. The lens controller receives, from the camera body, a predetermined timing signal and a drive information signal including information of a driving time which is a period from a start of driving the focus lens until an end of driving the focus lens. The lens controller controls the drive of the focus lens based on the drive information signal and the timing signal which are received from the camera body.

According to the aforementioned configuration, a drive information signal including information of driving time which is a period of time from the start of driving a focus lens to the end of driving the focus lens is transmitted from a camera body to an interchangeable lens. The interchangeable lens can recognize information of the driving time of the focus lens by obtaining the drive information signal. Accordingly, the drive control of the focus lens becomes relatively easy. As a result, the accuracy of a contrast autofocus operation of a lens-interchangeable camera system during recording a moving image can be improved.

DETAIL DESCRIPTION OF THE PREFERRED EMBODIMENTS

With reference to the accompanied drawings, preferred embodiments are detailed below.

First Embodiment

1-1. Configuration

1-1-1. Overview

Figure 1:
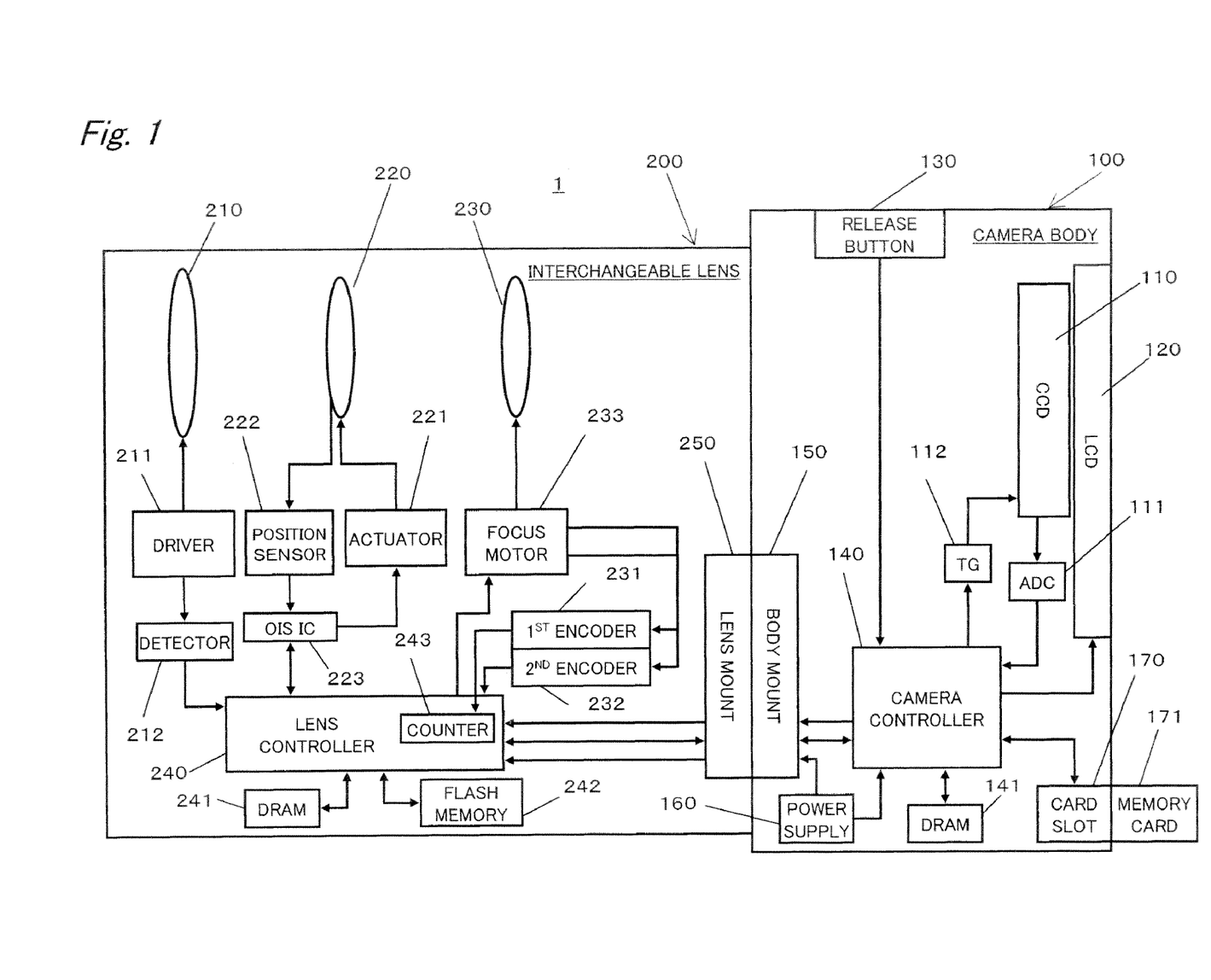
FIG. 1 is a block diagram showing a configuration of a camera system.

FIG. 1 is a block diagram showing a configuration of a camera system according to embodiments of the present invention. A camera system 1 includes a camera body 100 and an interchangeable lens 200 mountable to the camera body 100. The camera system 1 can perform an autofocus operation in a contrast method, based on image data generated by a CCD image sensor 110.

1-1-2. Configuration of the Camera Body

The camera body 100 includes the CCD image sensor 110, a liquid crystal display (LCD) monitor 120, a camera controller 140, a body mount 150, a power supply 160, and a card slot 170.

The camera controller 140 controls the entire operation of the camera system 1 by controlling components such as the CCD image sensor 110 in response to an instruction from operation members such as a release button 130. The camera controller 140 transmits a vertical synchronizing signal to a timing generator 112. In parallel with this, the camera controller 140 generates an exposure synchronizing (sync) signal. The camera controller 140 periodically transmits the generated exposure synchronizing signal to a lens controller 240 through the body mount 150 and a lens mount 250. The camera controller 140 uses a DRAM 141 as a work memory when performing a control operation or image processing operation.

The CCD image sensor 110 images a subject image that enters through the interchangeable lens 200 to generate image data. Specifically, the CCD image sensor 110 is exposed at predetermined timing to capture a subject image and generate image data. The generated image data is digitized by an AD converter 111. The digitized image data is subjected to predetermined image processing by the camera controller 140. The predetermined image processing includes, for example, a gamma correction process, a white balance correction process, a flaw correction process, a YC conversion process, an electronic zoom process, and a JPEG compression process.

The CCD image sensor 110 operates at timing that is controlled by the timing generator 112. The operations of the CCD image sensor 110 include a still-image capturing operation, a through-the-lens image (hereinafter, referred to as a "through image") capturing operation, and the like. The through image is mainly a moving image and is displayed on the LCD monitor 120 so that a user can determine composition for capturing a still image.

The LCD monitor 120 displays an image represented by display image data that is subjected to image processing by the camera controller 140. The LCD monitor 120 can selectively display both a moving image and a still image.

The card slot 170 allows the memory card 171 to be placed therein, and controls the memory card 171 under control of the camera controller 140. The memory card 171 can store image data generated by image processing by the camera controller 140. The memory card 171 can store, for example, JPEG image files. Image data or an image file stored in the memory card 171 can be read. The image data or image file read from the memory card 171 is subjected to image processing by the camera controller 140. For example, the camera controller 140 decompresses image data or an image file obtained from the memory card 171 to generate display image data.

The power supply 160 supplies power to be consumed by the camera system 1. The power supply 160 may be, for example, a dry battery or rechargeable battery. Alternatively, the power supply 160 may supply power to the camera system 1 from an external source through a power cable.

The body mount 150 can be mechanically and electrically connected to the lens mount 250 of the interchangeable lens 200. The body mount 150 can transmit and receive data with the interchangeable lens 200 through the lens mount 250. The body mount 150 transmits an exposure synchronizing signal received from the camera controller 140 to the lens controller 240 through the lens mount 250. Also, the body mount 150 transmits other control signals received from the camera controller 140, to the lens controller 240 through the lens mount 250. Also, the body mount 150 transmits a signal received from the lens controller 240 through the lens mount 250 to the camera controller 140. Also, the body mount 150 supplies power received from the power supply 160 to the entire interchangeable lens 200 through the lens mount 250.

1-1-3. Configuration of the Interchangeable Lens

The interchangeable lens 200 includes an optical system, the lens controller 240, and the lens mount 250. The optical system includes a zoom lens 210, an OIS lens 220, and a focus lens 230.

The zoom lens 210 is a lens for changing the magnification of a subject image to be formed by the optical system. The zoom lens 210 includes one or a plurality of lenses. A drive mechanism 211 includes a zoom ring or the like that can be operated by a user, and transmits an operation of the user to the zoom lens 210 to cause the zoom lens 210 to move along an optical axis direction of the optical system. A detector 212 detects a moving amount of the drive mechanism 211. The lens controller 240 can grasp a zoom magnification of the optical system by receiving a result of the detection by the detector 212.

The OIS lens 220 is a lens for correcting shake of a subject image to be formed by the optical system of the interchangeable lens 200. The OIS lens 220 moves in a direction to cancel the shake of the camera system 1, thereby reducing shake of a subject image on the CCD image sensor 110. The OIS lens 220 includes one or a plurality of lenses. An actuator 221 drives the OIS lens 220 in a plane vertical to an optical axis of the optical system, under the control of an OIS IC 223. The actuator 221 can be implemented by, for example, a magnet and a planar coil. A position detection sensor 222 is a sensor for detecting a position of the OIS lens 220 in the plane vertical to the optical axis of the optical system. The position detection sensor 222 can be implemented by, for example, a magnet and a Hall element. The OIS IC 223 controls the actuator 221 based on a detection result obtained by the position detection sensor 222 and a detection result obtained by a camera shake detector such as a gyro sensor. The OIS IC 223 obtains a detection result by the camera shake detector from the lens controller 240. Also, the OIS IC 223 transmits a signal indicating a status of an optical image shake correction process to the lens controller 240.

The focus lens 230 is a lens for changing a focus status of a subject image to be formed on the CCD image sensor 110 through the optical system. The focus lens 230 includes one or a plurality of lenses.

A focus motor 233 drives the focus lens 230 to move back and forth along the optical axis of the optical system under control of the lens controller 240. By this, the focus status of a subject image to be formed on the CCD image sensor 110 through the optical system can be changed. In the present embodiment, as the focus motor 233, a DC motor can be used. Note, however, that the present invention is not limited thereto and the focus motor 233 can also be implemented by a stepping motor, a servo motor, an ultrasonic motor, and the like.

Each of a first encoder 231 and a second encoder 232 is a conventional optical encoder for detecting rotation of the focus motor 233, which is implemented by, for example, a rotor mounted on a rotating shaft of the focus motor 233 and a photocoupler. The lens controller 240 counts detecting signals from the first and second encoders 231 and 232 with a counter 243 incorporated in the lens controller 240. The signal from the first encoder 231 is different in phase from that from the second encoder 232. Thus, it is possible to detect direction of rotation of the focus motor 233 by counting the detection signal from the first encoder 231 in combination with the detection signal from the second encoder 232. The lens controller 240 can recognize an amount of movement and a position of the focus lens 230 based on the count value of the counter 243.

The lens controller 240 controls the focus motor 233 in a first control mode or a second control mode. In the first control mode, the lens controller 240 controls the focus motor 233 by only using a detection signal from the first encoder 231. In the first control mode, only the detection signal from the first encoder 231 is used, and thus the direction of rotation of the focus motor 233 can not be detected. On the contrary, in the second control mode, the lens controller 240 controls the focus motor 233 by using the first and second encoders 231 and 232. In the second control mode, the lens controller 240 can also detect a direction of driving of the focus lens 230.

The lens controller 240 controls the entire interchangeable lens 200 by controlling the OIS IC 223, the focus motor 233, and the like, based on control signals from the camera controller 140. Also, the lens controller 240 receives signals from the detector 212, the OIS IC 223, the first encoder 231, the second encoder 232, and the like, and transmits the signals to the camera controller 140. Transmission and reception of data between the lens controller 240 and the camera controller 140 is performed through the lens mount 250 and the body mount 150. The lens controller 240 uses a DRAM 241 as a work memory when performing control. A flash memory 242 stores programs and parameters to be used for the control by the lens control 240.

1-1-4. Correspondence of Configurations Between the Embodiments and the Present Invention The focus motor 233 is an example of driver. The lens controller 240 is an example of lens controller. The CCD image sensor 110 is an example of imaging unit. A configuration including the camera controller 140 and the body mount 150 is an example of timing signal transmission unit. A configuration including the camera controller 140 and the body mount 150 is an example of drive signal transmission unit. The camera controller 140 is an example of body controller.

1-2. Operation 1-2-1. Imaging Preparation Operation

Figure 2:
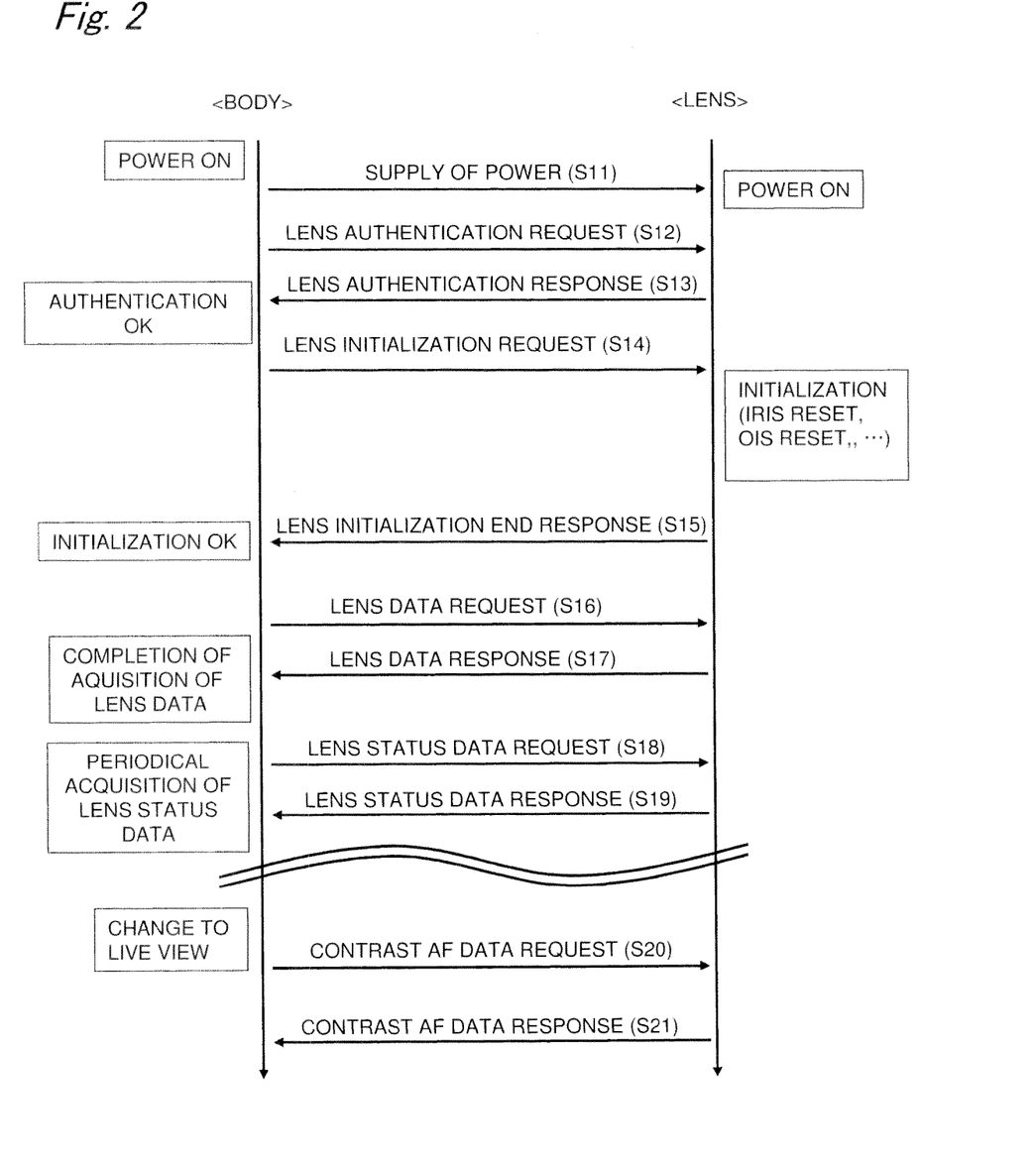
FIG. 2 is a diagram for describing an imaging preparation operation of the camera system.

First, the operation of the camera system 1 for imaging preparation will be described. FIG. 2 is a diagram showing signal transmission and reception in an imaging preparation operation of the camera system 1.

When a user turns on power to the camera body 100 with the interchangeable lens 200 mounted on the camera body 100, the power supply 160 supplies power to the interchangeable lens 200 through the body mount 150 and the lens mount 250 (S11). Then, the camera controller 140 requests the lens controller 240 for authentication information of the interchangeable lens 200 (S12). The authentication information of the interchangeable lens 200 includes information on whether the interchangeable lens 200 is mounted and information on whether accessories are mounted. The lens controller 240 responds to the lens authentication request from the camera controller 140 (S13).

Then, the camera controller 140 requests the lens controller 240 to perform an initialization operation (S14). In response to this, the lens controller 240 performs an initialization operation, such as reset of an iris and reset of the OIS lens 220. The lens controller 240 then sends a response indicating that the lens initialization operation has been completed to the camera controller 140 (S15).

Then, the camera controller 140 requests the lens controller 240 for lens data (S16). The lens data is stored in the flash memory 242. The lens controller 240 reads the lens data from the flash memory 242 and sends the lens data back to the camera controller 140 (S17). The lens data includes characteristic values specific to the interchangeable lens 200, such as a lens name, F-number, and a focal length.

When the camera controller 140 grasps the lens data of the interchangeable lens 200 mounted on the camera body 100, the camera system 1 goes into a status capable of imaging. In this status, the camera controller 140 periodically requests the lens controller 240 for lens status data indicating a status of the interchangeable lens 200 (S18). The lens status data includes, for example, information of zoom magnification of the zoom lens 210, information of position of the focus lens 230, and information of aperture value. In response to the request, the lens controller 240 sends back the requested lens status data to the camera controller 140 (S19).

In this status, the camera system 1 can operate in a control mode in which an image represented by image data generated by the CCD image sensor 110 is displayed on the LCD monitor 120 as a through image. This control mode is called "live view mode". In the live view mode, a through image, which is a moving image, is displayed on the liquid crystal monitor 120 so that the user can determine composition for imaging a still image while viewing the LCD monitor 120. For the method of an autofocus operation in the live view mode, a contrast method is generally used. This is because in the live view mode, image data is steadily generated by the CCD image sensor 110, and thus it is easy to perform a contrast autofocus operation using the generated image data.

When performing an autofocus operation in a contrast method, the camera controller 140 requests the lens controller 240 for data for contrast AF (S20). The data for contrast AF is data required for performing an autofocus operation in a contrast method, and includes, for example, a focus drive speed, the amount of focus shift, an image magnification, and information indicating whether contrast AF can be performed.

1-2-2. Contrast Autofocus Operation in Recording a Moving Image

Next, an autofocus operation of the camera system 1 in recording a moving image after the completion of imaging preparation will be described. Here, an autofocus operation in a contrast method (hereinafter, referred to as a "contrast AF operation") will be described.

Figure 3:
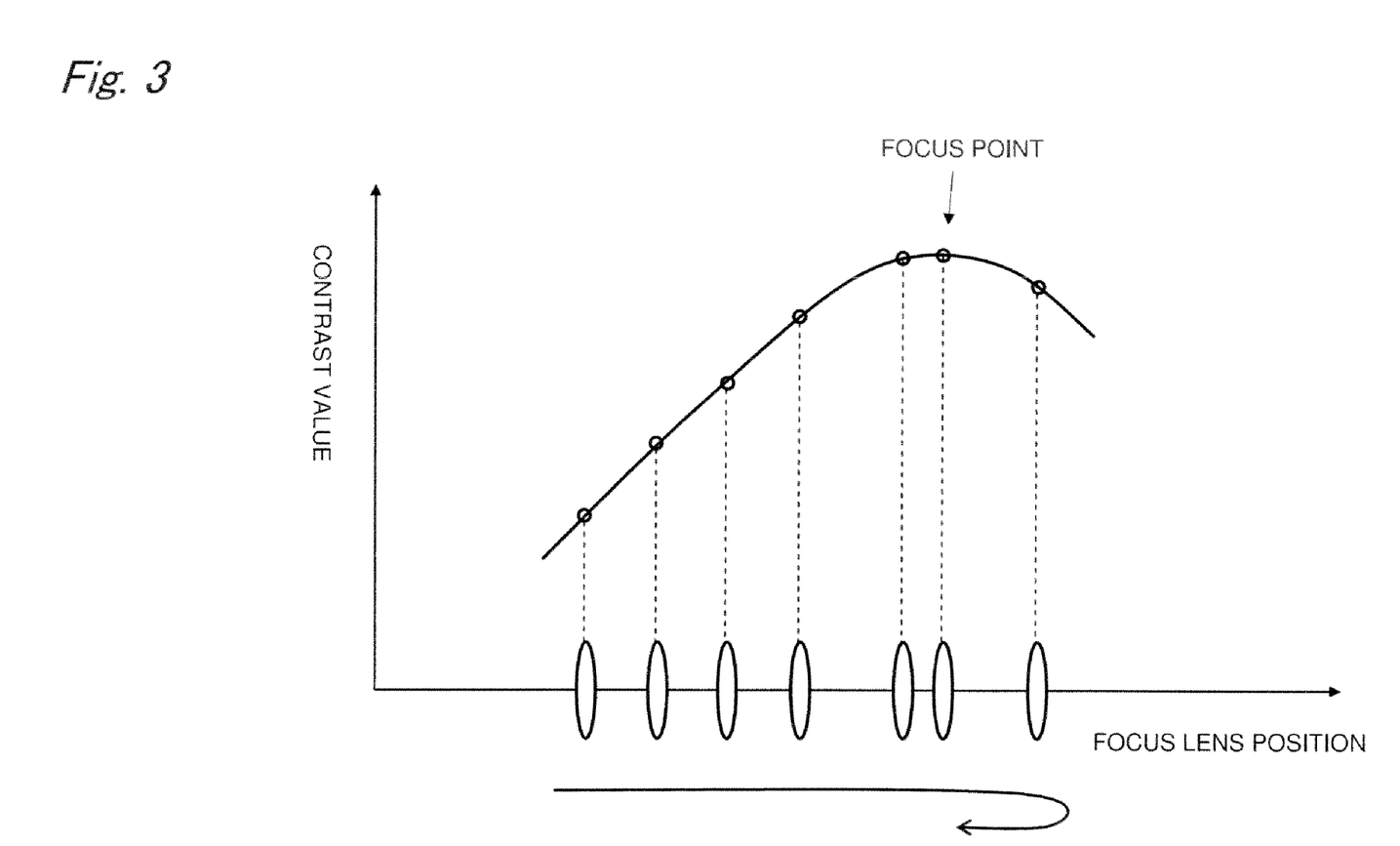
FIG. 3 is a diagram for describing an autofocus operation in a contrast method.

FIG. 3 is a diagram explaining the movement of a focus lens when a contrast AF operation of the camera system 1 according to the present embodiment is performed. As shown in the diagram, when the lens is moved from a position away from a focus position, the contrast value of an image becomes higher as the lens comes closer to the focus position, and reaches a maximum at the focus position. In the contrast AF operation according to the present embodiment, while the focus lens is continuously moved without being stopped, an image is captured at a timing that synchronizes with an edge change of an exposure synchronizing signal and position information of the focus lens at the timing is obtained. Then, a contrast value is obtained for each captured image. A position of the focus lens at which the contrast value reaches a maximum is obtained and then the position is determined to be a focus position. As shown in FIG. 3, a path of contrast values obtained when the focus lens is moved from a position away from a focus position toward the focus position represents a mountain shape. In the following description, an operation of causing the focus lens to move from a position away from a focus position toward the focus position is called "mountain-climbing (M/C)".

In the case of recording a still image, an image captured in a focus status is finally used as a still image. Thus, even if the focus lens is moved in a relatively wide range to obtain a maximum point of a contrast value for determining a focus position, there is no particular problem. However, in the case of imaging a moving image, when the focus lens is moved in a wide range, an out-of-focus moving image is obtained, decreasing image quality. Thus, wobbling control is generally performed when capturing a moving image.

Figures 4A, 4B:
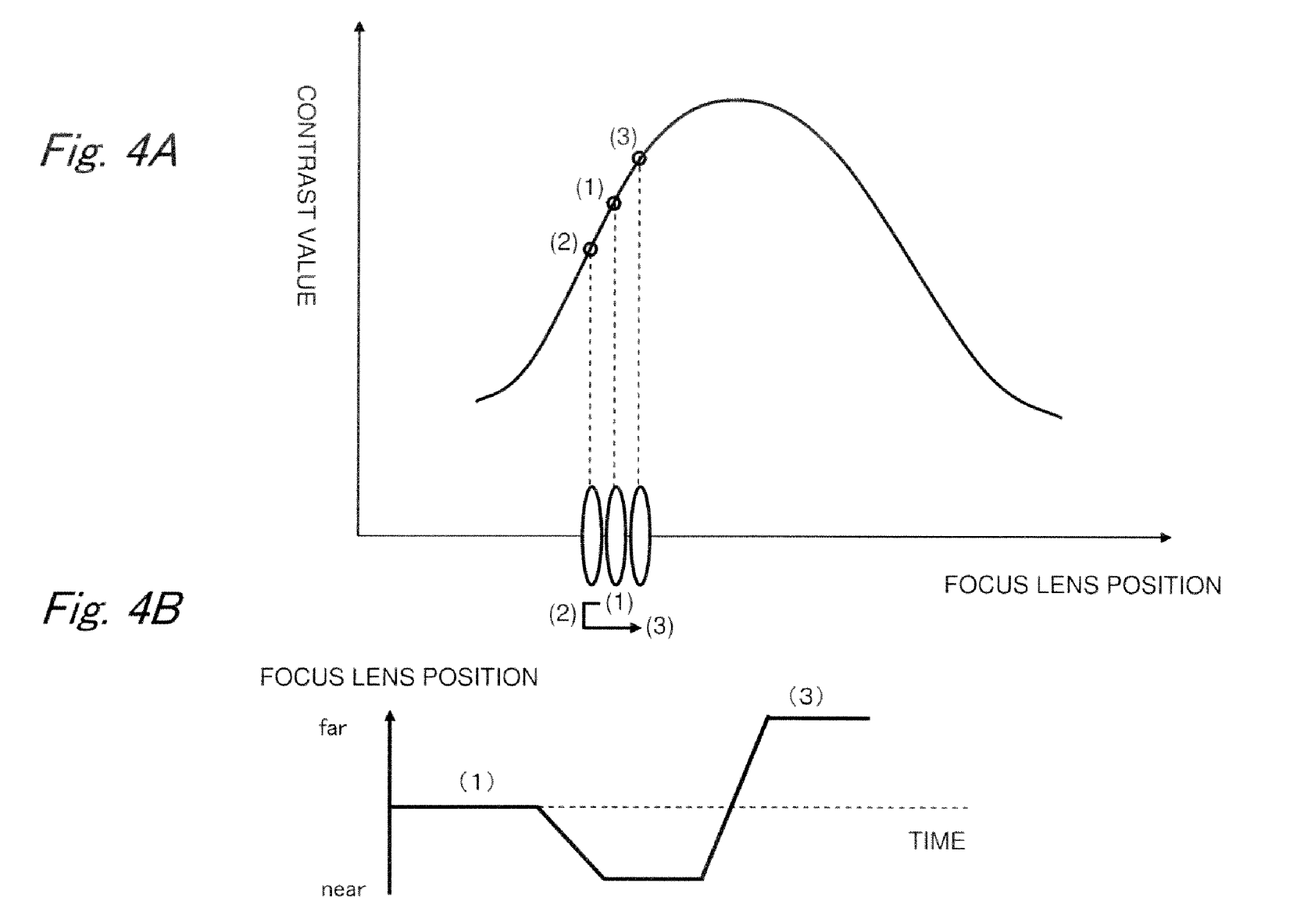
FIGS. 4A and 4B are diagrams for describing a wobbling control operation.

With reference to FIGS. 4A and 4B, wobbling control will be described. In wobbling control, the focus lens 230 is controlled to periodically move back and forth by a small distance. Since the moving distance of the focus lens 230 is small, a change in image quality is inconspicuous in a moving image, enabling to prevent degradation in image quality. For example, when, as shown in FIG. 4A, the focus lens 230 is located in position (1), according to wobbling control, the focus lens 230 moves from the position (1) to position (2) and thereafter moves from the position (2) to position (3). A contrast value of an image is obtained for each of the positions (1) to (3) to determine a direction in which there is a focus position. For example, in the case of FIG. 4A, the contrast value falls when the focus lens 230 moves from the position (1) to the position (2), and rises when the focus lens 230 moves from the position (1) to the position (3). From this fact, it can be estimated that there is a focus position in a direction of the position (3) as viewed from the position (1). Hence, it can be recognized that next the focus lens 230 should be moved in a direction going from the position (1) to the position (3). FIG. 4B is a diagram showing temporal alteration in lens position when the focus lens 230 is moved in the manner shown in FIG. 4A, with a horizontal axis representing time and a vertical axis representing position of the focus lens 230.

FIGS. 5A to 5E are timing charts for describing an autofocus operation of the camera system 1 by wobbling control upon imaging a moving image. Note that, in the present embodiment, the wording "a moving image" may refer to a moving image for a through image or a moving image to be recorded in the memory card 171. In an example of FIGS. 5A to 5E, it is assumed that the camera controller 140 operates in the live view mode.

Figure 5A:
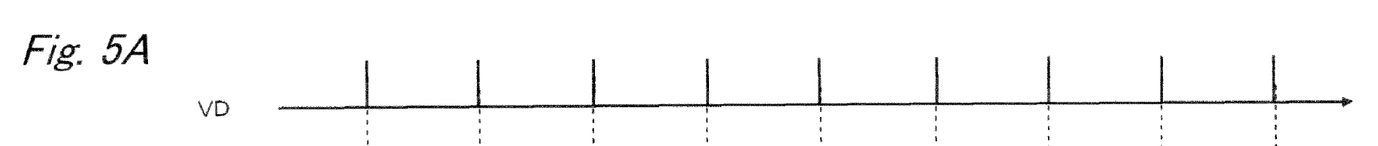
FIGS. 5A to 5E are timing charts for describing a wobbling control operation.
Figure 5B:
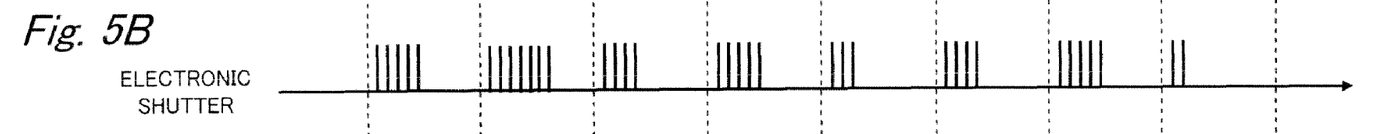
Figure 5C:
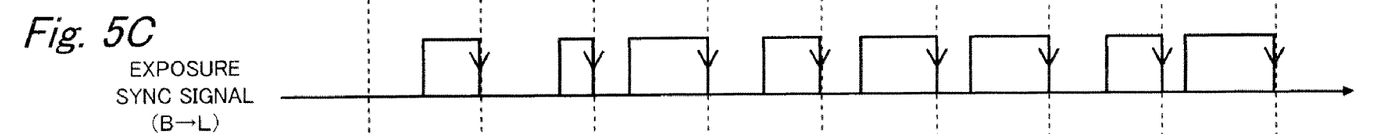
Figure 5D:
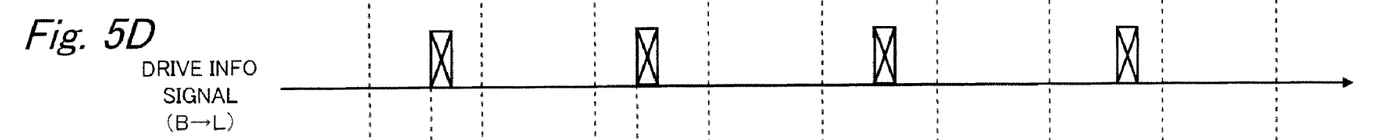
Figure 5E:
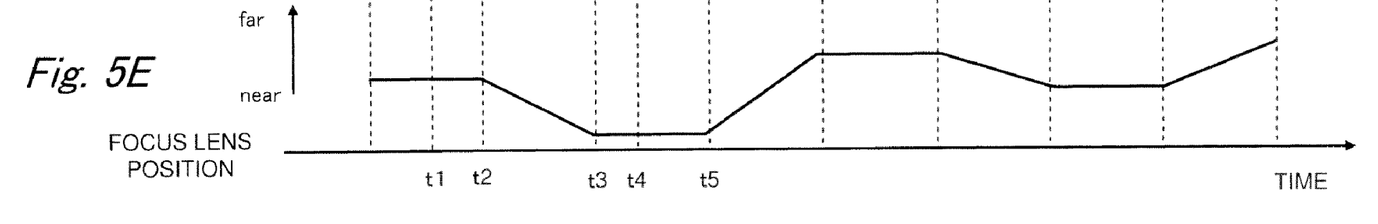

As shown in FIG. 5A, the camera controller 140 periodically generates a vertical synchronizing signal (VD). Also, as shown in FIG. 5C, the camera controller 140 generates an exposure synchronizing (sync) signal from a predetermined point in time based on the vertical synchronizing signal. The camera controller 140 grasps in advance exposure start timing and exposure end timing with respect to the vertical synchronizing signal, and thus, can generate an exposure synchronizing signal. The exposure synchronizing signal indicates an exposure period of the imaging element. The camera controller 140 outputs the vertical synchronizing signal to the timing generator 112 and outputs the exposure synchronizing signal to the lens controller 240. The lens controller 240 controls drive of the focus lens 230 in synchronization with the exposure synchronizing signal. A detail of this operation will be described later.

The timing generator 112 periodically generates electronic shutter drive signals (see FIG. 5B) based on the vertical synchronizing signal and drives the CCD image sensor 110 based on the electronic shutter drive signals and a read signal of the CCD image sensor 110.

Note that, in the present embodiment, the vertical synchronizing signal is used as the read signal of the CCD image sensor 110. However, as the read signal, other signals than the vertical synchronizing signal can also be used. That is, the read signal may be shifted in phase from the vertical synchronizing signal as long as the read signal changes in the same period as the vertical synchronizing signal. For example, a read signal can be periodically generated based on a vertical synchronizing signal by the timing generator 112.

The CCD image sensor 110 reads, according to the read signal, pixel data generated by numbers of photoelectric conversion elements (not shown) in the CCD image sensor 110, out to a vertical transferring unit (not shown).

Also, the CCD image sensor 110 performs an electronic shutter operation according to the electronic shutter drive signal. The electronic shutter operation can sweep out unnecessary charges.

The CCD image sensor 110 sweeps out charges by electronic shutter drive signals and reads pixel data with a read signal out to the vertical transferring unit. It means that an exposure operation for image data for a through image is performed during a period from the last one of a group of electronic shutter drive signals to a vertical synchronizing signal. The exposure synchronizing signal is a signal that indicates the exposure period and that rises at a rise of the last one of electronic shutter drive signals and falls at a rise of the vertical synchronizing signal (see FIG. 5C).

1-2-2-1. Processing Flow

Figure 6:
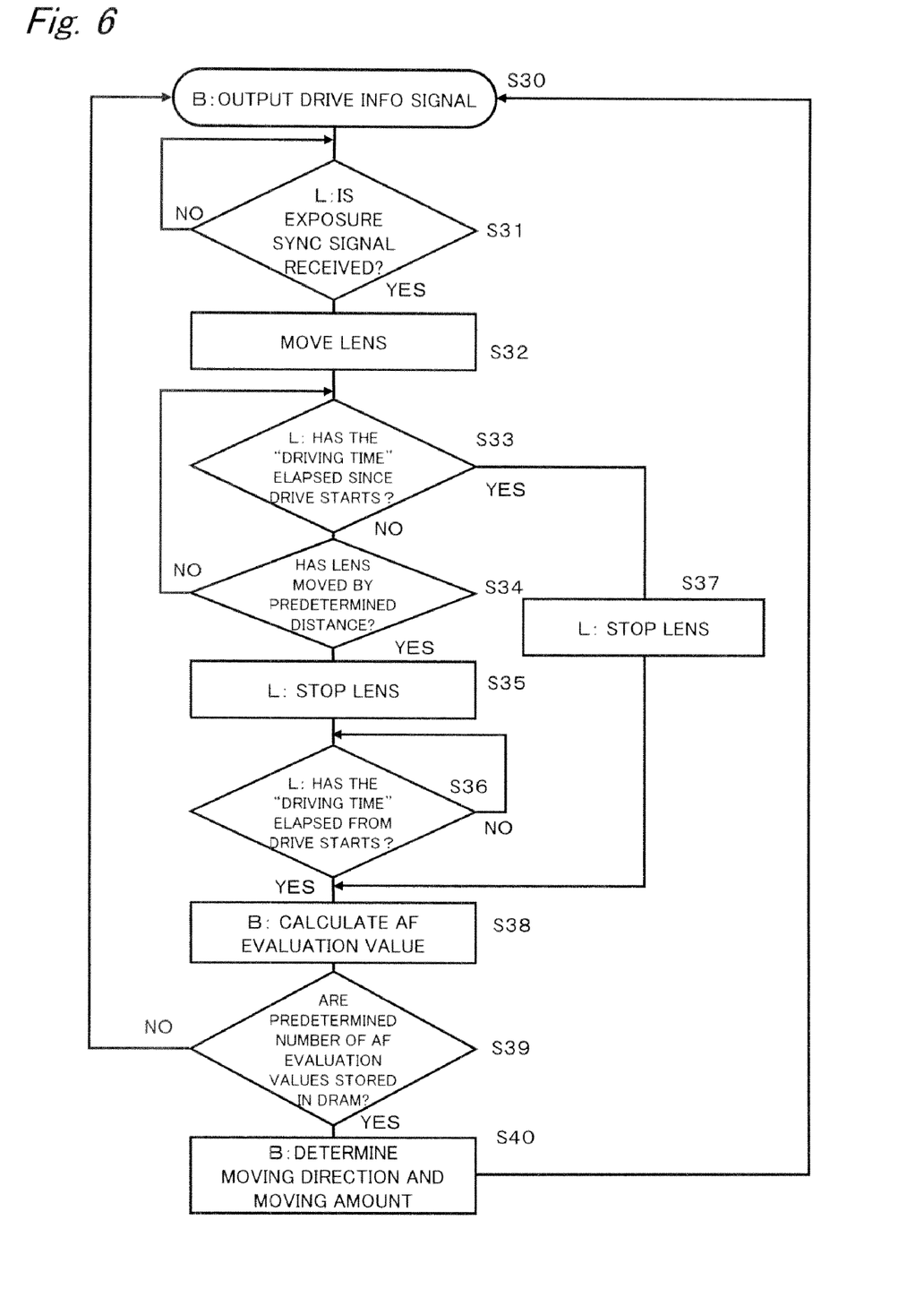
FIG. 6 is a flowchart for describing a wobbling control operation.

The flow of a contrast AF operation of the camera system 1 according to the first embodiment will be described with reference to a flowchart of FIG. 6.

When a user selects a moving image recording mode, the camera controller 140 transmits a drive information signal to the lens controller 240 (S30 and time t1 in FIGS. 5A to 5E). The drive information signal is a signal instructing start of wobbling control, and includes the following information concerning wobbling control:

1) a period of time from the start of driving the focus lens 230 to the end of driving the focus lens 230 (hereinafter, referred to as "driving time");

2) information on a moving direction of the focus lens 230; and 3) information on an amount of movement from the start of driving the focus lens 230.

Note that the drive information signal does not necessarily need to have such a configuration. For example, the drive information signal may include only information on driving time of the focus lens 230. Alternatively, the drive information signal may include only information on driving time of the focus lens 230 and information on a moving direction of the focus lens 230.

When receiving the drive information signal, the lens controller 240 determines whether an exposure synchronizing signal (falling edge) has been received from the camera controller 140 (S31).

If it is determined that an exposure synchronizing signal (falling edge) has been received, then the lens controller 240 controls the focus motor 233 to cause the focus lens 230 to start to move (S32 and time t2 in FIGS. 5A to 5E). At this time, the focus motor 233 moves the focus lens 230 in a moving direction of the focus lens 230 indicated by the drive information signal and by an amount of movement of the focus lens 230 indicated by the drive information signal. The interchangeable lens 200 (lens controller 240) can recognize information on the moving direction, amount of movement, and driving time of the focus lens 230 in the wobbling control, from the drive information signal, and accordingly, drive control of the focus lens 230 in the wobbling control is facilitated. Note that the focus lens 230 is controlled to move at a constant or substantially constant predetermined speed during a period of time from the start of driving the focus lens 230 until the driving time indicated by the drive information signal elapses.

After the start of movement of the focus lens 230, the lens controller 240 determines whether the time of moving lens which elapses from the start of the movement of the focus lens 230 has exceeded the driving time for the wobbling control (S33). In this example, the driving time is set to a period of time required for one frame of a moving image which is being captured. Thus, the driving time is determined according to the frame rate of a moving image being captured. For example, when the frame rate of a moving image being captured is 60 frames/second, the driving time is set to $\frac{1}{60}$ second. In the present embodiment, as long as the frame rate of a moving image being captured is constant, the driving time is constant. As such, since the driving time is always constant, the lens control becomes relatively easy. Note that the camera controller 140 should not set the driving time to be smaller than a minimum value of driving time of the focus lens 230 controllable in the interchangeable lens 220. This is because the control is impossible in the interchangeable lens 220 with such a smaller driving time.

Although, in the present embodiment, the driving time is a period of time required for one frame of a moving image being captured, the driving time may be a period of time required for two or three frames. That is, the driving time should be an integral multiple of a period of time required for one frame. Setting an upper limit of the driving time in a frame unit allows the focus lens 230 to be driven and stopped in a frame unit. Also, control of the drive and stop of the focus lens 230 in a frame unit causes the focus lens 230 to be kept stopping while an image for an evaluation in autofocus is exposed.

If the elapsing time has not exceeded the driving time, then the lens controller 240 determines whether the focus lens 230 has moved by a predetermined amount (S34). Here, the predetermined amount is an amount of movement of the focus lens 230 indicated by the drive information signal.

If it is determined that the focus lens 230 has not moved by a predetermined amount, then the lens controller 240 returns to step S33 again to determine whether the elapsing time has exceeded the driving time.

If it is determined that the focus lens 230 has moved by a predetermined amount, then the lens controller 240 controls the focus motor 233 to stop drive of the focus lens 230 (S35) and then determines whether the elapsing time of the focus lens 230 from the start of the drive of the focus lens 230 has exceeded the driving time (S36).

If it is determined that the elapsing time has exceeded the driving time, then the camera controller 140 calculates an evaluation value for an autofocus operation (hereinafter, referred to as an "AF evaluation value"), based on image data obtained from the CCD image sensor 110 (S38). At this time, the image data for calculating an AF evaluation value is image data generated several frames before and is image data generated in a frame in which the focus lens 230 is stopped. For an AF evaluation value calculation method, for example, it is generally known to obtain luminance signals from image data generated by the CCD image sensor 110 and add up high frequency components of the luminance signals in a screen so as to determine an AF evaluation value. With this method, an AF evaluation value for a lens position in which the focus lens 230 is stopped can be obtained.

On the other hand, if it is determined at step S33 that the elapsing time has exceeded the driving time, then the lens controller 240 controls the focus motor 233 to stop the drive of the focus lens 230 (S37 and time t3 in FIGS. 5A to 5E). Accordingly, when the elapsing time has exceeded the driving time, even if the focus lens 230 has not moved by the amount of movement indicated by the drive information signal, drive of the focus lens 230 is forcedly stopped. The driving time is set to a period of time required for a frame and accordingly the drive of the focus lens 230 can be controlled in a frame unit. Note that when the elapsing time has exceeded the driving time and thus the focus lens 230 has not been able to move by an instructed amount of movement, the lens controller 240 sets a predetermined flag (referred to as "focus drive nonattainment flag") indicating that the focus lens 230 has not been able to move by an instructed amount of movement to "1". A focus drive nonattainment flag is stored in the DRAM 141. The camera controller 240 can recognize that the focus lens 230 has not been able to move by an instructed amount of movement with reference to the focus drive nonattainment flag.

After drive of the focus lens 230 is stopped (S37), the camera controller 140 calculates an AF evaluation value based on image data obtained from the CCD image sensor 110 (S38). The calculated AF evaluation value is stored in the DRAM 141 in a state that the calculated AF evaluation value is associated with position information of the focus lens 230. In FIGS. 5A to 5E, an AF evaluation value is calculated between times t3 and t5.

After the calculation of an AF evaluation value, the camera controller 140 determines whether a predetermined number of AF evaluation values have been stored in the DRAM 141 (S39). The predetermined number is three in the present example but it may be two or more.

If it is determined that a predetermined number (three) of AF evaluation values have not been stored in the DRAM 141, then the camera controller 140 transmits a drive information signal to the lens controller 240 again so as to repeat drive/stop of the focus lens 230 and calculation of an AF evaluation value (S30 to S39) in the aforementioned manner.

If it is determined that a predetermined number (three) of AF evaluation values have been stored in the DRAM 141, then the camera controller 140 determines a drive method for the focus lens 230 based on the predetermined number of AF evaluation values stored in the DRAM 141 (S40). Here, the drive method includes the moving direction, amount of movement, and so on of the focus lens 230.

When a drive method for the focus lens 230 is determined, the camera controller 140 sends out a drive information signal again to the lens controller 240 to repeat the same process (S30 to S40). Here, the drive information signal includes information related to the determined drive method for the focus lens 230.

An autofocus operation with such wobbling control is performed upon capturing a moving image in the camera system 1 according to the present embodiment to always maintain a certain degree of a focus state with simple lens control.

Other Embodiments

Although the first embodiment is described above, the embodiment is not limited thereto. Other embodiments will be summarized in this section.

Although the first embodiment exemplifies as the second control mode a control mode using the first encoder 231 and the second encoder 232, the second control mode is not limited thereto. For example, the second control mode may use one encoder and a linear position detection sensor. The linear position detection sensor is, for example, a position sensor implemented by a linear resistor whose length is same as that of a drive range of the focus lens 230 and a contact that moves in contact with and on the resistor in conjunction with drive of the focus lens 230. In other words, the second control mode should be such a control mode that is relatively superior to the first control mode in accuracy of the position detection of a reversal of the drive direction of the focus lens 230 that is not intended by the lens controller 240. The first control mode does not necessarily need to be provided and only the second control mode may be provided.

Although the first embodiment exemplifies a configuration having the zoom lens 210 and the OIS lens 220, such lenses are not essential. That is, the idea of the first embodiment can also be applied to a camera system having a single-vision lens with no zoom function. Alternatively, the idea of the first embodiment can also be applied to a camera system having an interchangeable lens with no camera shake correction function.

Although the first embodiment exemplifies a camera body with no movable mirror, the first embodiment is not limited thereto. For example, a movable mirror may be included in a camera body or a prism for splitting a subject image may be included. Alternatively, a movable mirror may be included in an adapter instead of in a camera body.

In the first embodiment, a position of the focus lens 230 is not directly detected but indirectly detected by detecting an angle of rotation of the rotating shaft of the focus motor 233. As such, in the present invention, a position of the focus lens 230 may be directly detected or may be indirectly detected by detecting a position of a mechanical member that operates in conjunction with the focus lens 230. That is, detection can be performed in any manner as long as a position of the focus lens 230 can be identified eventually.

The first embodiment exemplifies a camera system that does not incorporate a phase-difference detection sensor. However, a camera system may incorporate a phase-difference detection sensor so that a phase-difference autofocus operation and a contrast autofocus operation can be selectively performed. In this case, the idea of the first embodiment is applicable when a contrast autofocus operation is performed.

Although the first embodiment exemplifies the CCD image sensor 110 as an imaging element, the imaging element is not limited thereto. The imaging element may be configured by a CMOS image sensor or NMOS image sensor. This enables a further reduction in power consumption and noise.

Figure 7A:
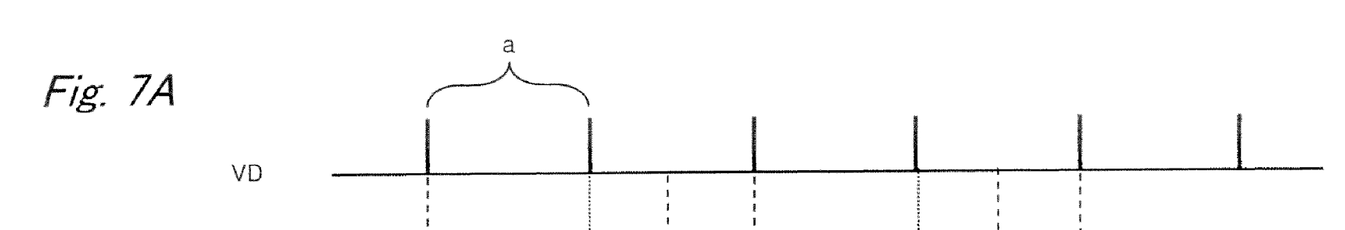
FIGS. 7A to 7D are diagrams for describing a wobbling control operation of a camera system including a MOS image sensor as an imaging element.
Figure 7B:
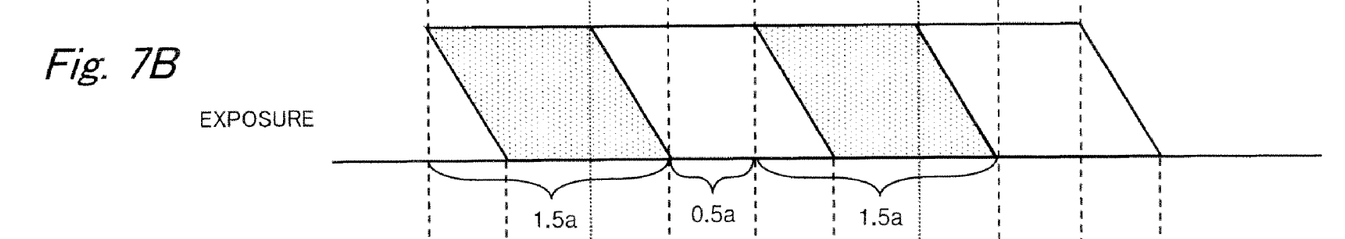

As described above, in a MOS image sensor, unlike a CCD image sensor, an exposure timing varies with the area of an imaging plane. Specifically, an exposure timing in a lower part of the imaging plane is delayed more than that in an upper part. Thus, as shown in FIG. 7B, exposure for one frame by a MOS image sensor is not completed within one vertical synchronizing period (hereinafter, referred to as a "1VD period"). Accordingly, even if stop and drive of a focus lens are repeated every 1VD period, a problem is caused in that an appropriate AF evaluation value cannot be obtained because the focus lens moves while exposure of a frame for calculating an AF evaluation value is performed.

Figure 7C:
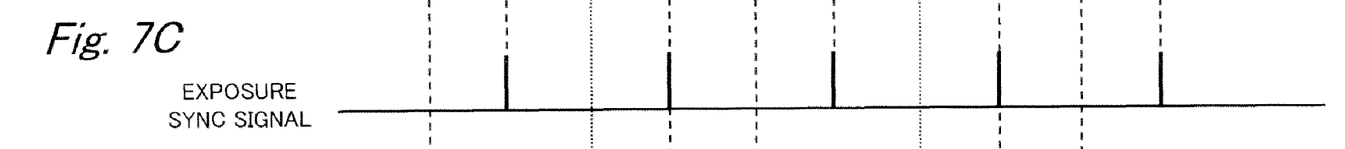
Figure 7D:
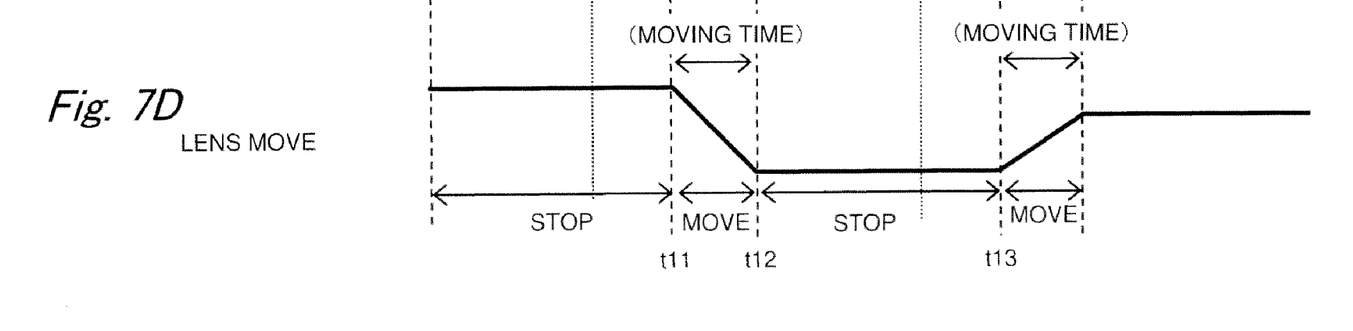

In the first embodiment, the driving time of the focus lens 230 is transmitted from the camera body 100 to the interchangeable lens 200, and this configuration can solve the aforementioned problem arising from a MOS image sensor. For example, it is assumed that the length of a 1VD period is "a", as shown in FIG. 7A, and the time required for exposing one frame is "1.5a", as shown in FIG. 7B. An exposure synchronizing signal is set to a signal which rises up at the end of the exposure period, as shown in FIG. 7C. In this case, the camera controller 140 transmits the driving time indicating 0.5a to the interchangeable lens 200. Hence, as shown in FIGS. 7A to 7D, the camera controller 140 can drive the focus lens 230 only for a period between time t11 and time t12 and subsequently stop the lens 230 for a period of 1.5a, thereby ensuring a stop period of 1.5a which is required for exposing one frame. This configuration allows the focus lens 230 to stop during a period (period of 1.5a in FIG. 7B) for capturing a frame for calculating an AF evaluation value and to move slightly back and forth at the other timing. As a result, the focus lens 230 can be stopped during exposure of a frame for calculating an AF evaluation value, enabling to obtain an appropriate AF evaluation value based on an image captured when the focus lens 230 stops.

Figure 8A:
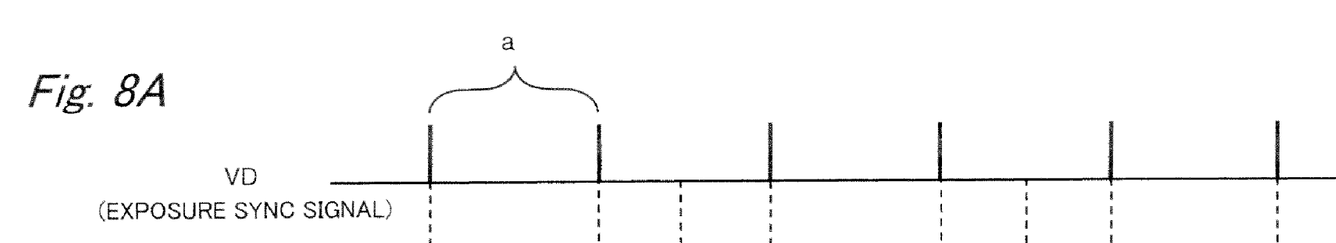
FIGS. 8A to 8C are diagrams for describing a wobbling control operation of a camera system including a MOS image sensor as an imaging element (when using a vertical synchronizing signal as an exposure synchronizing signal).
Figure 8B:
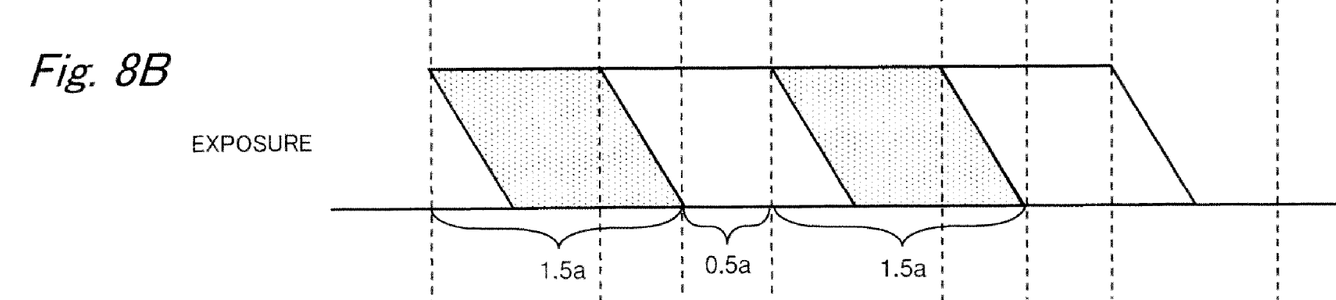
Figure 8C:
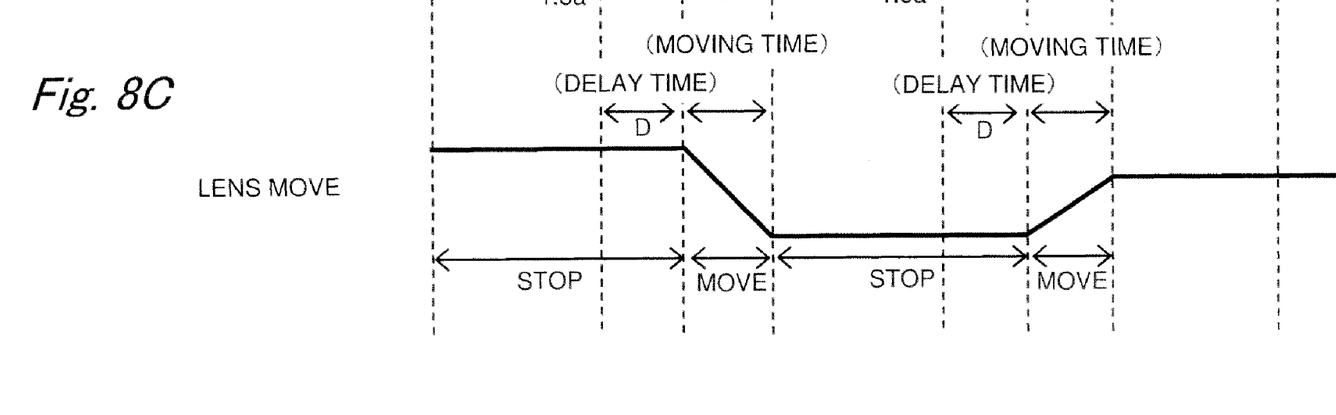

Note that the vertical synchronizing signal (see FIG. 8A) may be used, as an exposure synchronizing signal, for driving the lens during the wobbling control operation. In this case, a delay time D with respect to an exposure synchronizing signal may be set as shown in FIG. 8C, and information of the delay time D may be included in the drive information signal and transmitted to the lens controller 240. The lens controller 240 may start the lens driving operation at a timing made by delaying the exposure synchronizing signal by the delay time D.

Even when the imaging element is a CCD image sensor, information of the delay time to the exposure synchronizing signal may be included in the drive information signal and transmitted to the lens controller 240 which may start the lens driving operation at a timing made by delaying the exposure synchronizing signal by the delay time D. This is advantageous to wobbling control using a lens having bad response. That is, in the wobbling control using a lens having bad response, delaying of start timing of the lens drive by a predetermined time according to the lens response achieves exposure at a timing the lens is moved at an appropriate position.

INDUSTRIAL APPLICABILITY

The aforementioned embodiments can be applied to lens-interchangeable camera systems. Specifically, the aforementioned embodiments can be applied to digital still cameras, digital movie cameras, and so on.

Although the aforementioned description has been provided in connection with specified embodiments thereof, many other modifications, corrections and applications are apparent to those skilled in the art. Therefore, the embodiments are not limited by the disclosure provided herein. The present disclosure relates to subject matter contained in Japanese Patent Application No. 2008-086082, filed on Mar. 28, 2008, which is expressly incorporated herein by reference in its entirety.

What is claimed is:

1. A camera system comprising an interchangeable lens and a camera body,
   the interchangeable lens comprising:
   a focus lens operable to move back and forth in an optical axis direction to change a focus status of a subject image;
   a driver operable to drive the focus lens; and a lens controller operable to control an operation of the interchangeable lens based on control signals received from the camera body, the camera body comprising:

an imaging unit operable to image a subject at a predetermined frame rate to generate image data;

a timing signal generator operable to generate a predetermined timing signal and transmit the predetermined timing signal to the interchangeable lens;

a drive signal transmission unit operable to transmit a drive information signal including information of a driving time which is a period from a start of driving the focus lens to an end of driving the focus lens; and a body controller operable to control an operation of the camera body, wherein the body controller is operable to perform control to transmit the timing signal and the drive information signal to the interchangeable lens, and wherein the lens controller controls drive of the focus lens based on the drive information signal and the timing signal received from the camera body.

2. The camera system according to claim 1, wherein the drive information signal includes information of an amount of movement of the focus lens in the optical axis direction, and the lens controller performs control such that the focus lens moves by the amount of movement within the driving time.

3. The camera system according to claim 1, wherein the drive information signal includes information of an amount of movement of the focus lens in the optical axis direction, and if the focus lens is unable to move by the amount of movement within the driving time, the lens controller performs control to stop the drive of the focus lens when the driving time elapses.

4. The camera system according to claim 3, wherein the lens controller sets predetermined flag information when the focus lens is unable to move by the amount of movement within the driving time.

5. The camera system according to claim 1, wherein the lens controller performs control to drive the focus lens at a substantially constant speed within the driving time.

6. The camera system according to claim 1, wherein the body controller sets the driving time to be at least equal to a minimum speed at which the focus lens can be driven in the interchangeable lens.

7. The camera system according to claim 1, wherein the lens controller controls a wobbling operation to move the focus lens back and forth in the optical axis direction within a predetermined period, based on the drive information signal and the timing signal which are received from the camera body.

8. The camera system according to claim 1, wherein the drive signal transmission unit transmits the drive information signal to the interchangeable lens at a time interval correlated with a frame interval determined by the predetermined frame rate.

9. The camera system according to claim 1, wherein the drive information signal further includes information of a delay time, and the lens controller controls the drive of the focus lens based on a timing obtained by delaying a time provided by the predetermined timing signal by the delay time.

10. The camera system according to claim 1, wherein the timing signal generator generates the predetermined timing signal at a timing correlated with an exposure timing of the imaging unit.

11. The camera system according to claim 1, wherein the camera body further includes a calculation unit operable to calculate an evaluation value used for an autofocus based on the image data generated by the imaging unit, and the body controller controls transmission of the drive information signal according to the evaluation value calculated by the calculation unit.

12. A camera body to which an interchangeable lens having a focus lens capable of moving back and forth in an optical axis direction to change a focus status of a subject is mountable, the camera body comprising:

an imaging unit operable to image a subject at a predetermined frame rate to generate image data, the subject being formed through the interchangeable lens;

a timing signal generator operable to generate a predetermined timing signal and transmit the predetermined timing signal to the interchangeable lens;

a drive signal transmission unit operable to transmit a drive information signal including information of a driving time which is a period from a start of driving the focus lens to an end of driving the focus lens; and a body controller operable to control an operation of the camera body, wherein the body controller is operable to perform control to transmit the timing signal and the drive information signal to the interchangeable lens.

13. The camera body according to claim 12, wherein the drive information signal includes information of a delay time used to delay the predetermined timing signal.

14. An interchangeable lens mountable to a camera body, comprising:

a focus lens operable to move back and forth in an optical axis direction to change a focus status of a subject image;

a driver operable to drive the focus lens; and a lens controller operable to control an operation of the interchangeable lens based on control signals received from the camera body, wherein the lens controller is operable to receive, from the camera body, a predetermined timing signal and a drive information signal including information of a driving time which is a period from a start of driving the focus lens to an end of driving the focus lens, and wherein the lens controller is operable to control the drive of the focus lens based on the drive information signal and the timing signal received from the camera body.

15. The interchangeable lens according to claim 14, wherein the drive information signal includes information of an amount of movement of the focus lens in the optical axis direction, and the lens controller performs control such that the focus lens moves by the amount of movement within the driving time.

16. The interchangeable lens according to claim 14, wherein the drive information signal includes information of an amount of movement of the focus lens in the optical axis direction, and if the focus lens is unable to move by the amount of movement within the driving time, the lens controller performs control to stop the drive of the focus lens when the driving time elapses.

17. The interchangeable lens according to claim 14, wherein the lens controller sets predetermined flag information when the focus lens is unable to move by the amount of movement within the driving time.

18. The interchangeable lens according to claim 14, wherein the lens controller performs control to drive the focus lens at a substantially constant speed within the driving time.

19. The interchangeable lens according to claim 14, wherein
- the drive information signal further includes information of a delay time, and
- the lens controller controls the drive of the focus lens based on a timing obtained by delaying a time provided by the predetermined timing signal by the delay time.

* * * * *